(12) United States Patent
Caramma

(10) Patent No.: US 9,258,428 B2
(45) Date of Patent: Feb. 9, 2016

(54) AUDIO BANDWIDTH EXTENSION FOR CONFERENCING

(71) Applicant: Marcello Caramma, Bracknell (GB)

(72) Inventor: Marcello Caramma, Bracknell (GB)

(73) Assignee: Cisco Technology, Inc., San Jose, CA (US)

(*) Notice: Subject to any disclaimer, the term of this patent is extended or adjusted under 35 U.S.C. 154(b) by 522 days.

(21) Appl. No.: 13/718,204

(22) Filed: Dec. 18, 2012

(65) Prior Publication Data

US 2014/0169542 A1    Jun. 19, 2014

(51) Int. Cl.
| G06F 17/00 | (2006.01) |
| H04M 3/56 | (2006.01) |
| G10L 19/00 | (2013.01) |
| G10L 21/038 | (2013.01) |
| H04R 27/00 | (2006.01) |

(52) U.S. Cl.
CPC .............. *H04M 3/568* (2013.01); *G10L 21/038* (2013.01); *H04R 27/00* (2013.01)

(58) Field of Classification Search
CPC .................................................... G10L 21/038
See application file for complete search history.

(56) References Cited

U.S. PATENT DOCUMENTS

| 5,455,888 | A | 10/1995 | Iyengar et al. .............. 395/212 |
| 6,889,182 | B2 | 5/2005 | Gustafsson ................... 704/205 |
| 6,895,375 | B2 | 5/2005 | Malah et al. ................... 704/219 |
| 6,988,066 | B2 | 1/2006 | Malah ........................... 704/219 |
| 7,216,074 | B2 | 5/2007 | Malah et al. ................... 704/205 |
| 7,359,854 | B2 | 4/2008 | Nilsson et al. ................ 704/219 |
| 7,546,237 | B2 | 6/2009 | Nongpiur et al. ............. 704/209 |
| 7,613,604 | B1 | 11/2009 | Malah et al. ................... 704/205 |
| 7,630,881 | B2 | 12/2009 | Iser et al. ....................... 704/203 |
| 7,912,729 | B2 | 3/2011 | Nongpiur et al. ............. 704/500 |
| 7,916,876 | B1 * | 3/2011 | Helsloot et al. ................ 381/61 |
| 8,069,038 | B2 | 11/2011 | Malah et al. ................... 704/205 |
| 2002/0128839 | A1 | 9/2002 | Lindgren et al. .............. 704/258 |
| 2002/0138268 | A1 | 9/2002 | Gustafsson ................... 704/258 |
| 2003/0009327 | A1 | 1/2003 | Nilsson et al. ................ 704/219 |
| 2003/0093278 | A1 | 5/2003 | Malah ........................... 704/265 |
| 2003/0093279 | A1 | 5/2003 | Malah et al. ................... 704/265 |
| 2004/0243402 | A1 | 12/2004 | Ozawa ........................... 704/208 |
| 2005/0004803 | A1 | 1/2005 | Smeets et al. ................. 704/500 |
| 2005/0187759 | A1 | 8/2005 | Malah et al. ................... 704/200 |
| 2006/0106619 | A1 | 5/2006 | Iser et al. ....................... 704/500 |
| 2007/0150269 | A1 | 6/2007 | Nongpiur et al. ............. 704/226 |
| 2008/0126081 | A1 | 5/2008 | Geiser et al. .................. 704/201 |

(Continued)

OTHER PUBLICATIONS

Larsen, et al.; John Wiley & Sons, Ltd.; *Audio Bandwidth Extension; Application of Psychoacoustics, Signal Processing and Loudspeaker Design*; 301 pages, 2004.

(Continued)

*Primary Examiner* — Curtis Kuntz
*Assistant Examiner* — Thomas Maung
(74) *Attorney, Agent, or Firm* — Baker Botts L.L.P.

(57) ABSTRACT

In one embodiment, a method includes extracting, by a processor, components from an audio signal to generate a modulating signal. The audio signal is generated by an endpoint operable to capture audio proximate the endpoint. The method also includes filtering, by the processor, the audio signal to generate a band-limited audio signal. The method also includes modulating, by the processor, the band-limited audio signal by the modulating signal to generate an enhancement signal. The method also includes combining, by the processor, the audio signal and the enhancement signal to generate an enhanced audio signal.

9 Claims, 4 Drawing Sheets

(56) References Cited

U.S. PATENT DOCUMENTS

| | | | |
|---|---|---|---|
| 2008/0208572 A1 | 8/2008 | Nongpiur et al. | 704/205 |
| 2008/0300866 A1 | 12/2008 | Mukhtar et al. | 704/205 |
| 2009/0030699 A1 | 1/2009 | Iser et al. | 704/500 |
| 2010/0042408 A1 | 2/2010 | Malah et al. | 704/205 |
| 2010/0057476 A1 | 3/2010 | Sudo et al. | 704/500 |
| 2010/0063827 A1 | 3/2010 | Gao | 704/500 |
| 2010/0228543 A1* | 9/2010 | Kabal et al. | 704/207 |
| 2010/0246803 A1 | 9/2010 | Tashiro et al. | 379/392.01 |
| 2011/0054885 A1 | 3/2011 | Nagel et al. | 704/203 |
| 2011/0153318 A1 | 6/2011 | Rossello et al. | 704/208 |
| 2011/0231195 A1 | 9/2011 | Nongpiur et al. | 704/500 |
| 2011/0257980 A1 | 10/2011 | Gao | 704/500 |
| 2011/0288873 A1* | 11/2011 | Nagel et al. | 704/500 |
| 2012/0010880 A1 | 1/2012 | Nagel et al. | 704/205 |
| 2012/0070007 A1 | 3/2012 | Kim et al. | 381/22 |
| 2012/0095757 A1 | 4/2012 | Gibbs et al. | 704/219 |
| 2012/0095758 A1 | 4/2012 | Gibbs et al. | 704/219 |
| 2012/0106742 A1 | 5/2012 | Bharitkar et al. | 381/17 |
| 2012/0116769 A1 | 5/2012 | Malah et al. | 704/262 |

OTHER PUBLICATIONS

Arttu Laaksonen; Helsinki University of Technology; *Bandwidth Extension in High-Quality Audio Coding*; 69 pages, May 30, 2005.

* cited by examiner

AUDIO BANDWIDTH EXTENSION FOR CONFERENCING

TECHNICAL FIELD OF THE INVENTION

This disclosure relates generally to the field of communications and, more specifically, to audio bandwidth extension for conferencing.

BACKGROUND OF THE INVENTION

For some conferences or meetings, all the attendees or participants may not be in the same location. For example, some of the participants may be in one conference room, while other participants may be in another conference room and/or at various separate remote locations. Participants may join the conference using communication equipment of varying capabilities. For example, some equipment may be capable of producing and/or capturing higher quality audio than other equipment. Participants may wish to seamlessly participate in a conference, regardless of the particular characteristics of the communication equipment used by each participant.

BRIEF DESCRIPTION OF THE DRAWINGS

For a more complete understanding of the present disclosure, reference is now made to the following description, taken in conjunction with the accompanying drawings, in which.

DETAILED DESCRIPTION

Overview

In one embodiment, a method includes extracting, by a processor, components from an audio signal to generate a modulating signal. The audio signal is generated by an endpoint operable to capture audio proximate the endpoint. The method also includes filtering, by the processor, the audio signal to generate a band-limited audio signal. The method also includes modulating, by the processor, the band-limited audio signal by the modulating signal to generate an enhancement signal. The method also includes combining, by the processor, the audio signal and the enhancement signal to generate an enhanced audio signal.

In another embodiment, a system includes a processor. The system also includes a non-transitory computer-readable storage medium embodying software. The software is operable when executed by the processor to receive an audio signal from a first endpoint. The first endpoint is operable to capture audio proximate the first endpoint. The software is further operable when executed to filter the audio signal to generate a band-limited audio signal. The software is further operable when executed to modulate, by a carrier signal at a selected frequency, the band-limited audio signal to generate an enhancement signal. The software is further operable when executed to combine the audio signal and the enhancement signal to generate an enhanced audio signal. The software is further operable when executed to transmit the enhanced audio signal to a second endpoint remote from the first endpoint.

Description

Figure 1A:
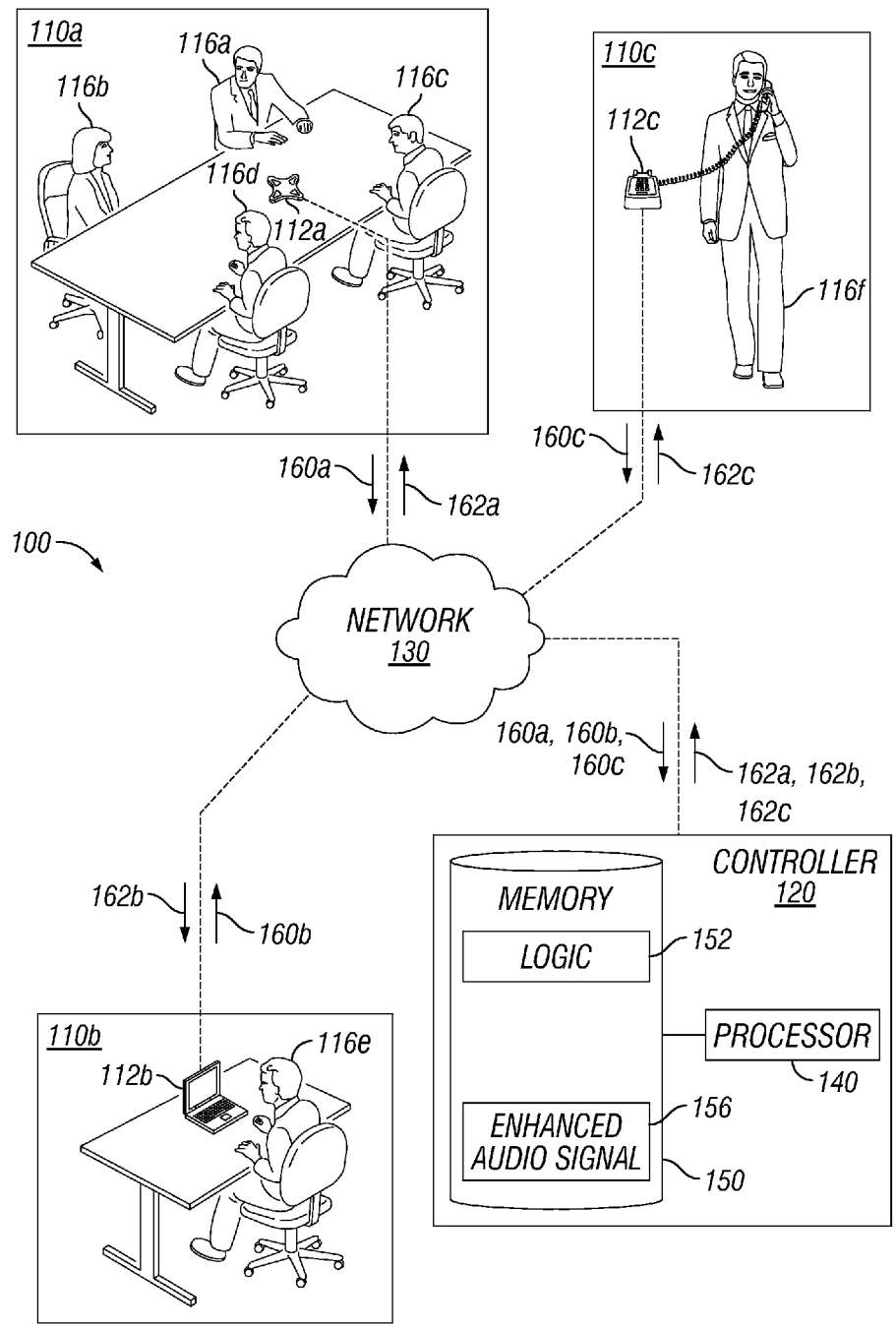
FIG. 1A illustrates an example conferencing system, in accordance with certain embodiments of the present disclosure.

FIG. 1A illustrates an example conferencing system 100, in accordance with certain embodiments of the present disclosure. In general, conferencing system 100 may allow numerous users 116, some or all of whom may be in different or remote locations, to participate in a conference. Conferencing system 100 may include one or more conference locations 110, one or more endpoints 112, one or more users 116, and a controller 120. Endpoints 112 and controller 120 may be communicatively coupled by a network 130.

Some of the endpoints 112 may capture and/or produce higher quality audio than other endpoints 112. Users 116 joining the conference via a higher quality endpoint 112 may expect high quality audio, even if other users 116 are using lower quality endpoints 112. Conferencing system 100 may enhance audio received from lower quality endpoints 112 to improve the conferencing experience for users 116 using higher quality endpoints 112. For example, conferencing system 100 may use audio bandwidth extension methods to improve the perceived quality of a relatively narrowband audio signal received from a lower quality endpoint 112. In certain embodiments, conferencing system 100 may perform the enhancement using non-linear time-domain methods, allowing for relatively low computational complexity and real-time implementation.

A conference may represent any meeting, conversation, or discussion between users 116. For example, conferencing system 100 may allow each user 116 to hear what remote users 116 are saying. Conference locations 110 may be any location from which one or more users 116 participate in a conference. In the example of FIG. 1, users 116a-d are located in a first conference location 110a, user 116e is located in a second conference location 110b, and user 116f is located in a third conference location 110c, all of which are remote from one another. In certain other embodiments, multiple users 116 may be located in the second conference location 110b and/or the third conference location 110c. Conferencing system 100 may include any suitable number of conference locations 110, and any suitable number of users 116 may be located at each conference location 110. Conference location 110 may include a conference room, an office, a home, or any other suitable location.

Each conference location 110 may include an endpoint 112. Endpoint 112 may refer to any device that connects a conference location 110 to a conference. Endpoint 112 may be operable to capture audio and/or video from conference location 110 (e.g. using one or more microphones and/or cameras) and transmit the audio or video signal 160 to endpoints 112 at other conference locations 110 (e.g. through controller 120). Endpoint 112 may also be operable to play audio or video signals 162 received from controller 120. In some embodiments, endpoint 112 may include a speakerphone, conference phone, telephone, computer, workstation, Internet browser, electronic notebook, Personal Digital Assistant (PDA), cellular or mobile phone, pager, or any other suitable device (wireless, wireline, or otherwise), component, or element capable of receiving, processing, storing, and/or communicating information with other components of conferencing system 100. Endpoint 112 may also comprise any suitable user interface such as a display, microphone, speaker, keyboard, or any other appropriate terminal equipment usable by a user 116. Conferencing system 100 may comprise any suitable number and combination of endpoints 112.

In the example of FIG. 1A, endpoints 112a and 112b may represent higher quality endpoints, and endpoint 112c may represent a lower quality endpoint. In particular, audio signals 160a-b (produced by endpoints 112a-b) may be of higher quality than audio signal 160c (produced by endpoint 112c).

In certain embodiments, network 130 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, controller 120 may refer to any suitable combination of hardware and/or software implemented in one or more modules to process data and provide the described functions and operations. In some embodiments, controller 120 and/or logic 152 may include a communication solution such as WebEx, available from Cisco Systems, Inc. In some embodiments, the functions and operations described herein may be performed by multiple controllers 120. In some embodiments, controller 120 may include, for example, a mainframe, server, host computer, workstation, web server, file server, a personal computer such as a laptop, or any other suitable device operable to process data. In some embodiments, controller 120 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, controller 120 may be a web server running, for example, Microsoft's Internet Information Server™.

In general, controller 120 communicates with endpoints 112 to facilitate a conference between users 116. In some embodiments, controller 120 may include a processor 140 and memory 150. Memory 150 may refer to any suitable device capable of storing and facilitating retrieval of data and/or instructions. Examples of memory 150 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other volatile or non-volatile computer-readable memory devices that store one or more files, lists, tables, or other arrangements of information. Although FIG. 1 illustrates memory 150 as internal to controller 120, it should be understood that memory 150 may be internal or external to controller 120, depending on particular implementations. Also, memory 150 may be separate from or integral to other memory devices to achieve any suitable arrangement of memory devices for use in conferencing system 100.

Memory 150 is generally operable to store logic 152 and enhanced audio signal 156. Logic 152 generally refers to logic, rules, algorithms, code, tables, and/or other suitable instructions for performing the described functions and operations. Enhanced audio signal 154 may represent the result of processing one or more audio signals 160 to improve the perceived sound quality of the audio signals.

Memory 150 is communicatively coupled to processor 140. Processor 140 is generally operable to execute logic 152 stored in memory 150 to facilitate a conference between users 116 according to the disclosure. Processor 140 may include one or more microprocessors, controllers, or any other suitable computing devices or resources. Processor 140 may work, either alone or with components of conferencing system 100, to provide a portion or all of the functionality of conferencing system 100 described herein. In some embodiments, processor 140 may include, for example, any type of central processing unit (CPU).

In operation, logic 152, when executed by processor 140, facilitates a conference between users 116. Logic 152 may receive audio and/or video signals 160 from endpoints 112. In the example of FIG. 1, logic 152 receives audio signal 160a from endpoint 112a, audio signal 160b from endpoint 112b, and audio signal 160c from endpoint 112c. Audio signal 160 may represent audio captured by the endpoint 112, such as the voices of the users 116 proximate the endpoint 112.

Figure 1B:
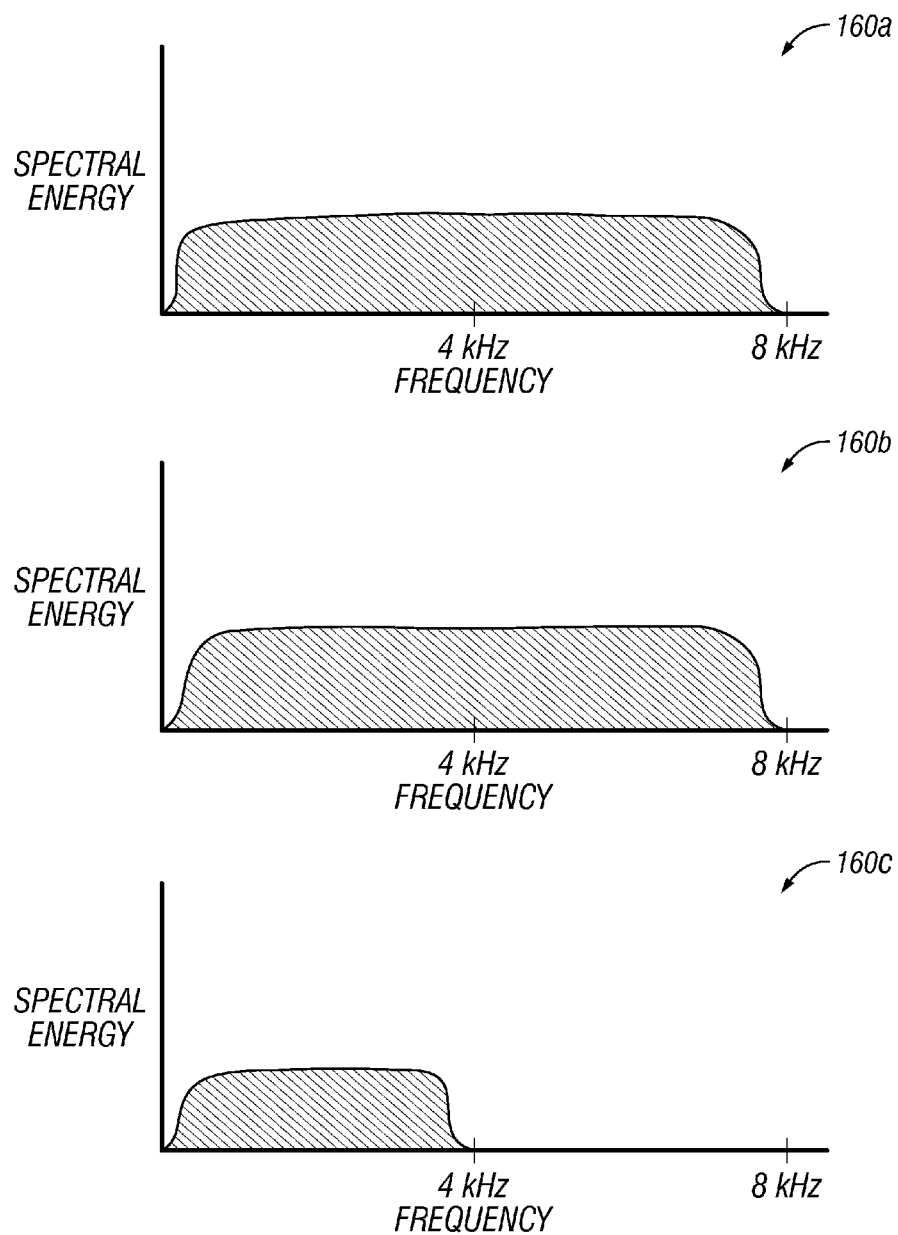
FIG. 1B illustrates example graphs of example audio signals, in accordance with certain embodiments of the present disclosure.

FIG. 1B illustrates example graphs of example audio signals 160a-c, in accordance with certain embodiments of the present disclosure. Each graph illustrates the frequencies at which spectral energy may be present in audio signals 160a-c. In the example of FIG. 1B, audio signals 160a-b contain spectral energy between 0 kHz and 8 kHz. In some embodiments, audio signals 160a-b may have been generated using an analog-to-digital converter at a sampling frequency of 16 kHz. In certain other embodiments, audio signals 160a-b may have been generated using a low-pass filter with a cut-off frequency of approximately 8 kHz. On the other hand, audio signal 160c contains spectral energy between 0 kHz and 4 kHz. In some embodiments, audio signal 160c may have been generated using a sampling frequency of 8 kHz. In certain other embodiments, audio signal 160c may have been generated using a low-pass filter with a cut-off frequency of approximately 4 kHz.

Thus, audio signals 160a-b are relatively wideband signals as compared to audio signal 160c, a relatively narrowband signal. In particular, audio signals 160a-b contain spectral energy between 4 kHz and 8 kHz, while audio signal 160c does not. The lack of such high frequency content in audio signal 160c may be audibly detectible to a user 116 who listens to the audio signals 160a-c played back.

Logic 152 may be able to detect the bandwidth of an audio signal 160. If logic 152 detects that an audio signal 160 is a narrowband signal and/or lacks high frequency content, logic 152 may use the lower-frequency content (e.g. between 0 kHz and 4 kHz) in audio signal 160c to enhance audio signal 160c. For example, logic 152 may generate an enhancement signal to add to audio signal 160c based on the lower-frequency content already present in audio signal 160c. The enhancement signal may include high frequency content (e.g. between 4 kHz and 8 kHz). Logic 152 may then combine the audio signal 160 with the generated enhancement signal to produce an enhanced audio signal 156. The enhanced audio signal 156 may have spectral energy between 0 kHz and 8 kHz (i.e. a relatively wideband signal as compared to the source audio signal 160). Example methods for generating the enhanced audio signal 156 are described in more detail in connection with FIGS. 2-3.

Although the example of FIG. 1B uses particular frequencies to describe audio signals 160a-c, this disclosure contemplates the use of any suitable frequencies, according to particular needs. For example, audio signals 160a-c may have any suitable bandwidth. Similarly, ranges for high frequency content and low frequency content may be selected to correspond to any suitable frequencies, according to particular needs.

Logic 152 may transmit audio and/or video signals 162 to endpoints 112. In the example of FIG. 1, logic 152 transmits audio signal 162a to endpoint 112a, audio signal 162b to endpoint 112b, and audio signal 162c to endpoint 112c. In certain embodiments, each endpoint 112 may receive an audio signal 162 corresponding to a mixture of the audio signals 160 generated by each of the other endpoints 112. For example, logic 152 may combine audio signal 160a and audio signal 160b to produce audio signal 162c, which is then transmitted to endpoint 112c. Thus, user 116f at location 110c will receive an audio signal 162c corresponding to the audio signals 160a-b captured at locations 110a-b.

If logic 152 determines that an audio signal 160 needs to be enhanced using audio bandwidth extension (e.g. audio signal 160 has a bandwidth below a particular threshold), logic 152 may use the enhanced audio signal 156 rather than the original audio signal 160 when producing audio signals 162. For example, logic 152 may determine that audio signal 160c is relatively narrowband and should be enhanced. Logic 152 may produce an enhanced audio signal 156 corresponding to audio signal 160c. Logic 152 may then produce audio signal 162a by combining audio signal 160b and enhanced audio signal 156. Logic 152 may transmit audio signal 162a to endpoint 112a. Logic 152 may also produce audio signal 162b by combining audio signal 160a and enhanced audio signal 156. Logic 152 may transmit audio signal 162b to endpoint 112a.

Thus, as a result of the audio enhancement performed by logic 152, a higher quality endpoint 112 may receive wideband audio signals 162 for each of the other endpoints 112, even if some of those endpoints are lower quality endpoints 112 that produce a more narrowband audio signal 160.

Although in the example of FIG. 1A logic 152 generates only one enhanced audio signal 156, this disclosure contemplates that logic 152 may generate any suitable number of enhanced audio signals 156 corresponding to any suitable number of audio signals 160, according to particular needs. Likewise, in creating audio signals 162, logic 152 may mix any suitable number and combination of audio signals 160 with any suitable number and combination of enhanced audio signals 156, according to particular needs.

In certain embodiments, the audio enhancement may be performed by endpoints 112, rather than logic 152 of controller 120. As one example, a higher quality endpoint 112a may receive audio signals 160b-c from endpoints 112b-c (either directly or via controller 120). Endpoint 112a may determine that audio signal 160c is relatively narrowband and should be enhanced. Endpoint 112a may produce an enhanced audio signal corresponding to audio signal 160c. Logic 152 may then produce audio signal 162a by combining audio signal 160b and the enhanced audio signal created using audio signal 160c. In creating audio signals 162, endpoints 112 may mix any suitable number and combination of audio signals 160 with any suitable number and combination of enhanced audio signals, according to particular needs.

Figure 2:
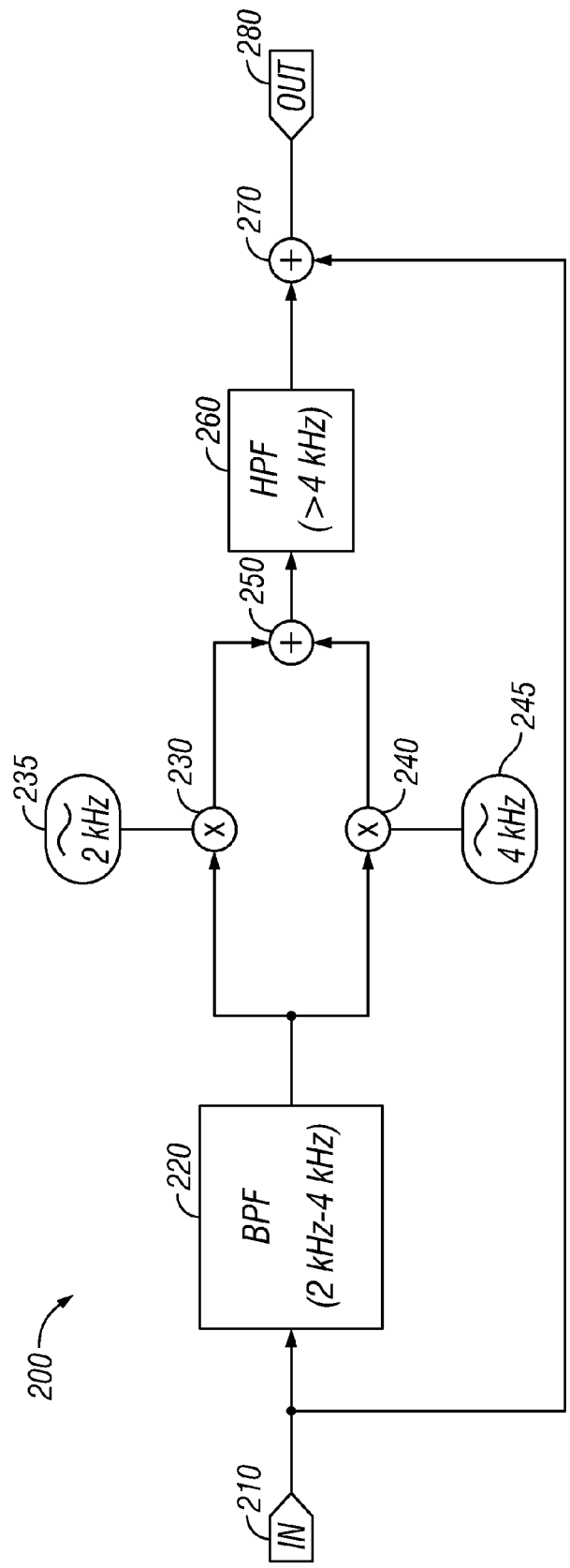
FIG. 2 illustrates an example block diagram implementing an example method for audio bandwidth extension, in accordance with certain embodiments of the present disclosure.

FIG. 2 illustrates an example block diagram 200 implementing an example method for audio bandwidth extension, in accordance with certain embodiments of the present disclosure. In certain embodiments, block diagram 200 may be implemented using any suitable combination of hardware (which may include a semiconductor-based or other integrated circuit (IC) such as, for example, a field-programmable gate array (FPGA) or an ASIC), software, digital circuitry, and/or analog circuitry. In certain embodiments, logic 152, when executed by one or more processors, may be operable to perform the operations depicted in block diagram 200.

At block 210, the system receives an input signal. For example, the input signal may be an audio signal 160 (e.g. from an endpoint 112) that controller 120 determines needs to be enhanced using audio bandwidth extension. In the example of FIG. 2, the input signal has spectral energy between 0 kHz and approximately 4 kHz.

At block 220, the input signal is filtered using a band-pass filter to generate a band-limited audio signal. In the example of FIG. 2, the filter has a passband between 2 kHz and 4 kHz. In some embodiments, the passband may selected to capture the highest frequency content available in the input signal. This disclosure contemplates selection of any suitable filter using any suitable parameters, according to particular needs.

At block 230, the band-limited audio signal is modulated by a carrier signal 235 at a first selected frequency to generate a first enhancement signal. In the example of FIG. 2, the carrier signal 235 is a sine wave at 2 kHz. As a result, the first enhancement signal has spectral energy between 4 kHz and 6 kHz. In certain embodiments, the first selected frequency may be approximately equal to the width of the passband used in block 220.

At block 240, the band-limited audio signal is modulated by a carrier signal 245 at a second selected frequency to generate a second enhancement signal. In the example of FIG. 2, the carrier signal 245 is a sine wave at 4 kHz. As a result, the second enhancement signal has spectral energy between 6 kHz and 8 kHz. In certain embodiments, the second selected frequency may be approximately equal to twice the width of the passband used in block 220.

At block 250, the first and second enhancement signals are summed to produce an enhanced audio signal. In certain embodiments, a weighted sum may be used. The weights to be used for each of the first and second enhancement signal may be determined based on the power in the input signal, the power in the band-limited audio signal, the power in the carrier signal 235, the power in the carrier signal 245, the power in the first enhancement signal, the power in the second enhancement signal, statistical analysis of reference speech signals, empirical analysis based on qualitative evaluations (e.g. of the naturalness of the bandwidth extension), and/or by any other suitable method. The weighting may be fixed, or they may be adaptively determined. For example, the weighting on the first enhancement signal may be selected based on the power in the input signal (either instantaneous power or an average power over some period of time). The weighting on the second enhancement signal may then be selected based on the weighting of the first enhancement signal. For instance, the weighting on the second enhancement signal may be selected to be half the weighting on the first enhancement signal.

Because the first enhancement signal has spectral energy between 4 kHz and 6 kHz and the second enhancement signal has spectral energy between 6 kHz and 8 kHz, the enhanced audio signal has spectral energy between 4 kHz and 8 kHz. Thus, the enhanced audio signal contains high frequency content (between 4 kHz and 8 kHz) generated based on the lower frequency content present in the input signal (between 0 kHz and 4 kHz). At block 260, the enhanced signal may be filtered using a high-pass filter with a cut-off frequency of approximately 4 kHz. This may minimize the presence of any lower frequency content in the enhanced audio signal. In certain embodiment, this filtering may be omitted. This disclosure contemplates selection of any suitable filter using any suitable parameters, according to particular needs.

At block 270, the original input signal is added to the enhanced audio signal. As a result, the enhanced audio signal will have spectral energy between 0 kHz and 8 kHz. The lower frequency components come from the input signal (0 kHz to 4 kHz), while the higher frequency components may be generated using the process just described (4 kHz to 8 kHz). In certain embodiments, a weighted sum may be used. The weights to be used for the input signal and the enhanced audio signal may be determined based on the power in the input signal, the power in the enhanced audio signal, statistical analysis of reference speech signals, empirical analysis based on qualitative evaluations (e.g. of the naturalness of the bandwidth extension), and/or by any other suitable method. The weighting may be fixed, or they may be adaptively determined. At block 280, the enhanced audio signal is output from the system.

Although the example of FIG. 2 describes the signals as containing particular frequencies, this disclosure contemplates the use of signals containing any suitable frequencies, according to particular needs. For example, the input signal may have any suitable bandwidth. Similarly, filter passbands and/or cut-off frequencies may be selected to correspond to any suitable frequencies, according to particular needs.

Figure 3:
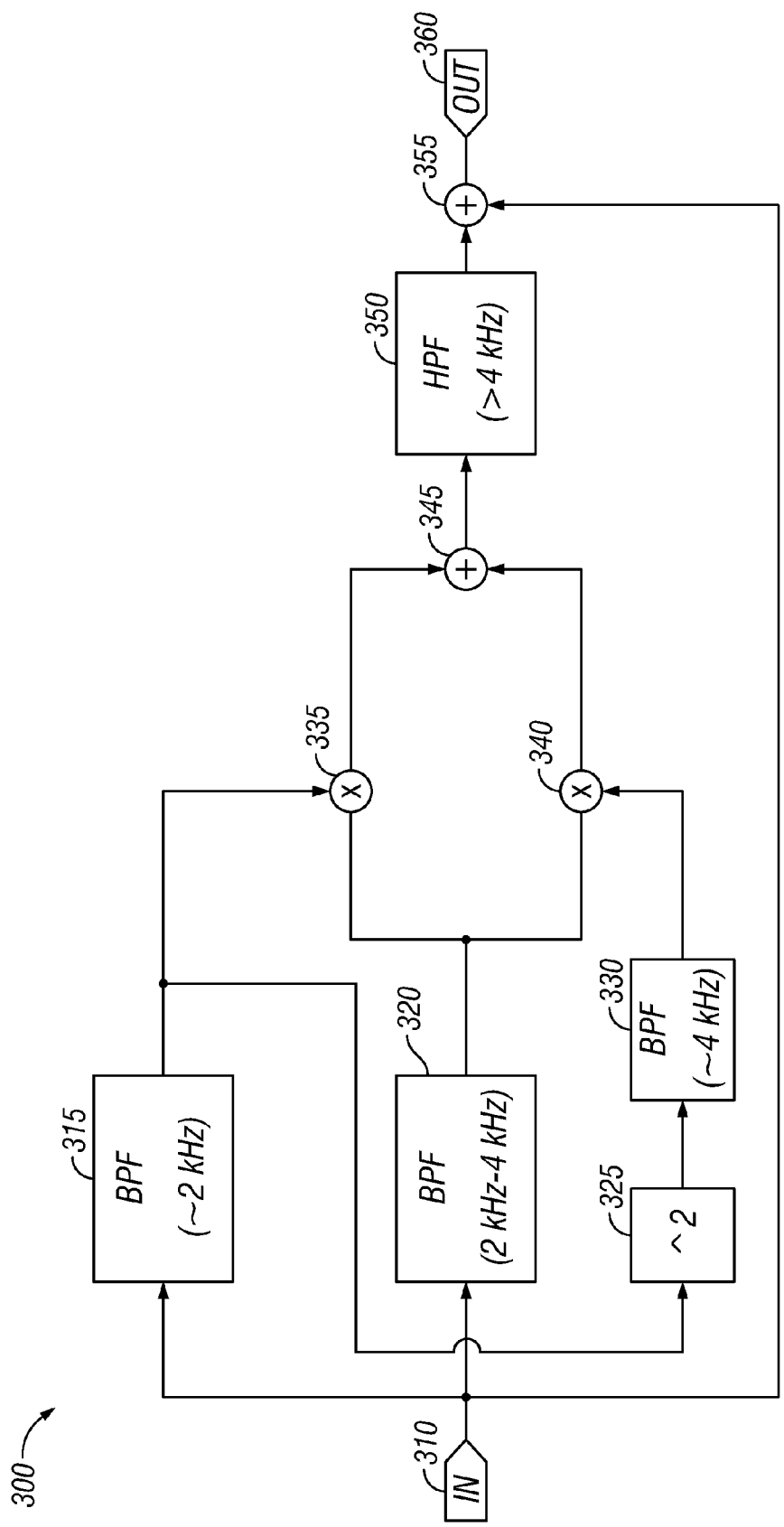
FIG. 3 illustrates another example block diagram implementing another example method for audio bandwidth extension, in accordance with certain embodiments of the present disclosure.

FIG. 3 illustrates another example block diagram 300 implementing another example method for audio bandwidth extension, in accordance with certain embodiments of the present disclosure. In certain embodiments, block diagram 300 may be implemented using any suitable combination of hardware (which may include a semiconductor-based or other integrated circuit (IC) such as, for example, a field-programmable gate array (FPGA) or an ASIC), software, digital circuitry, and/or analog circuitry. In certain embodiments, logic 152, when executed by one or more processors, may be operable to perform the operations depicted in block diagram 300.

At block 310, the system receives an input signal. For example, the input signal may be an audio signal 160 (e.g. from an endpoint 112) that controller 120 determines needs to be enhanced using audio bandwidth extension. In the example of FIG. 3, the input signal has spectral energy between 0 kHz and approximately 4 kHz.

At block 315, the input signal is filtered using a band-pass filter to generate a first modulating signal. In the example of FIG. 3, the filter has a relatively narrow passband (approximately 0.5 kHz wide) centered at approximately 2 kHz. In certain embodiments, the center frequency may be selected to be approximately equal to the width of the passband used in block 320, and the passband of the filter may be relatively narrow compared to the passband of the filter used in block 320. This disclosure contemplates selection of any suitable filter using any suitable parameters, according to particular needs. Thus, the first modulating signal may contain components extracted from the input signal in a relatively narrow frequency band around 2 kHz. In certain embodiments, at block 315, the output of the band-pass filter may be normalized and/or compressed using any suitable algorithm. For example, peaks in the spectrum may be detected and/or tracked over time using various attack and decay parameters, and the magnitude of the first modulating signal may be reduced based on the detected peaks.

At block 325, the first modulating signal is squared to produce a squared signal. This operation may introduce higher frequency content, such as in a frequency band around 4 kHz. This may be advantageous because, in certain embodiments, the input signal may not contain spectral energy around 4 kHz. As an example, some telephone systems may filter out most frequencies above 3.5 kHz.

At block 330, the squared signal is filtered using a band-pass filter to generate a second modulating signal. In the example of FIG. 3, the filter has a relatively narrow passband (approximately 0.5 kHz wide) centered at approximately 4 kHz. In certain embodiments, the center frequency may be selected to be approximately equal to twice the width of the passband used in block 320, and the passband of the filter may be relatively narrow compared to the passband of the filter used in block 320. This disclosure contemplates selection of any suitable filter using any suitable parameters, according to particular needs. Thus, the second modulating signal may contain components extracted from the squared signal in a relatively narrow frequency band around 4 kHz.

At block 320, the input signal is filtered using a band-pass filter to generate a band-limited audio signal. In the example of FIG. 3, the filter has a passband between 2 kHz and 4 kHz. In some embodiments, the passband may be selected to capture the highest frequency content available in the input signal. This disclosure contemplates selection of any suitable filter using any suitable parameters, according to particular needs.

At block 335, the band-limited audio signal is modulated by the first modulating signal (generated by block 315) to generate a first enhancement signal. In the example of FIG. 3, the first modulating signal contains components extracted from the input signal in a relatively narrow frequency band around 2 kHz, as discussed above. As a result, the first enhancement signal has spectral energy between 4 kHz and 6 kHz.

At block 340, the band-limited audio signal is modulated by the second modulating signal (generated by block 330) to generate a second enhancement signal. In the example of FIG. 3, the second modulating signal contains components extracted from the input signal in a relatively narrow frequency band around 4 kHz, as discussed above. As a result, the second enhancement signal has spectral energy between 6 kHz and 8 kHz.

At block 345, the first and second enhancement signals are summed to produce an enhanced audio signal. In certain embodiments, a weighted sum may be used. The weights to be used for each of the first and second enhancement signal may be determined based on the power in the input signal, the power in the band-limited audio signal, the power in the first modulating signal, the power in the second modulating signal, the power in the first enhancement signal, the power in the second enhancement signal, statistical analysis of reference speech signals, empirical analysis based on qualitative evaluations (e.g. of the naturalness of the bandwidth extension), and/or by any other suitable method. The weightings may be fixed, or they may be adaptively determined. For example, the weighting on the first enhancement signal may be selected based on the power in the input signal (either instantaneous power or an average power over some period of time). The weighting on the second enhancement signal may then be selected based on the weighting of the first enhancement signal. For instance, the weighting on the second enhancement signal may be selected to be half the weighting on the first enhancement signal.

Because the first enhancement signal has spectral energy between 4 kHz and 6 kHz and the second enhancement signal has spectral energy between 6 kHz and 8 kHz, the enhanced audio signal has spectral energy between 4 kHz and 8 kHz. Thus, the enhanced audio signal contains high frequency content (between 4 kHz and 8 kHz) generated based on the lower frequency content present in the input signal (between 0 kHz and 4 kHz). At block 350, the enhanced signal may be filtered using a high-pass filter with a cut-off frequency of approximately 4 kHz. This may minimize the presence of any lower frequency content in the enhanced audio signal. In certain embodiment, this filtering may be omitted. This disclosure contemplates selection of any suitable filter using any suitable parameters, according to particular needs.

At block 355, the original input signal is added to the enhanced audio signal. As a result, the enhanced audio signal will have spectral energy between 0 kHz and 8 kHz. The lower frequency components come from the input signal (0 kHz to 4 kHz), while the higher frequency components may be generated using the process just described (4 kHz to 8 kHz). In certain embodiments, a weighted sum may be used. The relative weights to be used for the input signal and the enhanced audio signal may be determined based on the power in the input signal, the power in the enhanced audio signal, the power in the band-limited audio signal, the power in the modulating signal, the power in the enhancement signal, statistical analysis of reference speech signals, empirical analysis based on qualitative evaluations (e.g. of the naturalness of the bandwidth extension), and/or by any other suitable method. The weighting may be fixed, or they may be adaptively determined. At block 360, the enhanced audio signal is output from the system.

Although the example of FIG. 3 describes the signals as containing particular frequencies, this disclosure contemplates the use of signals containing any suitable frequencies, according to particular needs. For example, the input signal may have any suitable bandwidth. Similarly, filter passbands and/or cut-off frequencies may be selected to correspond to any suitable frequencies, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a processor; and
a non-transitory computer-readable storage medium embodying software that is operable when executed by the processor to:
receive an audio signal from a first endpoint, the first endpoint operable to capture audio proximate the first endpoint;
extract components from the audio signal to generate a modulating signal;
filter the audio signal to generate a band-limited audio signal;
modulate, by the modulating signal, the band-limited audio signal to generate an enhancement signal; and
wherein:
the modulating signal is a first modulating signal;
the enhancement signal is a first enhancement signal; and
the software is further operable when executed to:
generate a second modulating signal based on the first modulating signal; and
modulate, by the second modulating signal, the band-limited audio signal to generate a second enhancement signal;
combine the audio signal, the first enhancement signal, and the second enhancement signal to generate an enhanced audio signal; and
transmit the enhanced audio signal to a second endpoint remote from the first endpoint; and
wherein the software is further operable when executed to:
extract components from the audio signal to generate the first modulating signal by filtering the audio signal via a first band-pass filter having a narrow passband as compared to a bandwidth of the band-limited audio signal; and
generate the second modulating signal by:
squaring the first modulating signal to generate a squared signal;
filtering the squared signal via a second band-pass filter having a narrow passband as compared to the bandwidth of the band-limited audio signal, wherein the passband of the first band-pass filter is substantially nonoverlapping with the passband of the second band-pass filter.

2. The system of claim 1, wherein the software is further operable when executed to generate the enhanced audio signal by combining the audio signal, the first enhancement signal, and the second enhancement signal.

3. The system of claim 2, wherein the software is further operable when executed to combine the audio signal, the first enhancement signal, and the second enhancement signal by applying a weighting to one or more of the audio signal, the first enhancement signal, and the second enhancement signal.

4. The system of claim 3, wherein the software is further operable when executed to adaptively determine the weighting based on one or more of:
a power of the audio signal;
a power of the band-limited audio signal;
a power of the first modulating signal;
a power of the second modulating signal;
a power of the first enhancement signal; and
a power of the second enhancement signal.

5. A system, comprising:
a processor; and
a non-transitory computer-readable storage medium embodying software that is operable when executed by the processor to:
receive an audio signal from a first endpoint, the first endpoint operable to capture audio proximate the first endpoint;
filter the audio signal to generate a band-limited audio signal having an upper limit corresponding to the highest frequency in the audio signal, the band-limited audio signal having a passband;
modulate, by a first carrier signal at a frequency approximately equal to the width of the passband of the band-limited audio signal, the band-limited audio signal to generate an first enhancement signal;
modulate, by a carrier signal at a frequency approximately equal to twice the width of the passband of the band-limited audio signal, the band-limited audio signal to generate a second enhancement signal;
combine the first enhancement signal and the second enhancement signal to produce a combined enhancement signal;
combine the audio signal and the combined enhancement signal to generate an enhanced audio signal; and
transmit the enhanced audio signal to a second endpoint remote from the first endpoint.

6. A method, comprising:

extracting, by a processor, components from an audio signal to generate first and second modulating signals, the audio signal generated by a first endpoint operable to capture audio proximate the endpoint;

filtering, by the processor, the audio signal to generate a band-limited audio signal having a passband, the band-limited audio signal having an upper limit corresponding to the highest frequency in the audio signal;

modulating, by the processor, the band-limited audio signal by the first modulating signal to generate a first enhancement signal;

modulating, by the processor, the band-limited audio signal by the second modulating signal to generate a second enhancement signal;

combining the first enhancement signal and the second enhancement signal to generate a combined enhancement signal;

combining, by the processor, the audio signal and the combined enhancement signal to generate an enhanced audio signal; and transmit the enhanced audio signal to a second endpoint remote from the first endpoint;

wherein the first modulating signal has a frequency approximately equal to an integer multiple of the passband of the band-limited audio signal, the integer being at least one; and wherein the second modulating signal has a frequency greater than the first modulating signal.

7. The method of claim 6, wherein extracting components from the audio signal to generate the modulating signal comprises filtering the audio signal via a band-pass filter having a narrow passband as compared to a bandwidth of the band-limited audio signal.

8. The method of claim 6, further comprising normalizing the modulating signal prior to modulating the band-limited audio signal by the modulating signal.

9. The method of claim 6, wherein combining the audio signal and the combined enhancement signal comprises applying a weighting to one or more of the audio signal and the combined enhancement signal.

* * * * *